US008600754B2

(12) United States Patent (10) Patent No.: US 8,600,754 B2
Rychlik (45) Date of Patent: *Dec. 3, 2013

(54) SYSTEM AND METHOD OF PROVIDING VOICE UPDATES FROM A NAVIGATION SYSTEM THAT RECOGNIZES AN ACTIVE CONVERSATION

(71) Applicant: Qualcomm Incorporated, San Diego, CA (US)

(72) Inventor: Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,868

(22) Filed: Oct. 9, 2012

(65) Prior Publication Data

US 2013/0029695 A1 Jan. 31, 2013

Related U.S. Application Data

(63) Continuation-in-part of application No. 12/763,061, filed on Apr. 19, 2010.

(51) Int. Cl.
 *G10L 13/00* (2006.01)
 *G10L 11/02* (2006.01)
 *G01C 21/00* (2006.01)

(52) U.S. Cl.
 USPC ............ 704/270; 704/274; 704/233; 701/400

(58) Field of Classification Search
 None
 See application file for complete search history.

(56) References Cited

U.S. PATENT DOCUMENTS

| 6,980,993 | B2 | 12/2005 | Horvitz et al. |
| 7,373,181 | B2 * | 5/2008 | Vogedes et al. ............... 455/567 |
| 7,827,561 | B2 | 11/2010 | McKee et al. |
| 7,865,904 | B2 | 1/2011 | McKee et al. |
| 7,890,960 | B2 | 2/2011 | McKee et al. |
| 8,275,307 | B2 | 9/2012 | Doyle et al. |
| 2006/0106615 | A1 | 5/2006 | Tateishi et al. |
| 2007/0266191 | A1 | 11/2007 | Schnepp et al. |
| 2008/0251110 | A1 | 10/2008 | Pede |
| 2009/0055088 | A1 | 2/2009 | Zhang et al. |
| 2011/0257966 | A1 | 10/2011 | Rychlik |

FOREIGN PATENT DOCUMENTS

DE 102007043264 A1 3/2009

OTHER PUBLICATIONS

International Preliminary Report on Patentability—PCT/US2011/026263, The International Bureau of WIPO—Geneva, Switzerland, Apr. 3, 2012.
International Search Report and Written Opinion—PCT/US2011/026263—ISA/EPO—May 31, 2011.

* cited by examiner

*Primary Examiner* — Talivaldis Ivars Smits
(74) *Attorney, Agent, or Firm* — Nicholas A. Cole

(57) ABSTRACT

Various embodiments of methods and systems for providing informational updates, such as directional updates, to a user of a computing device are disclosed. The method and system may recognize an active conversation and monitor the conversation for a lull. During a detected lull, the method and system may deliver the informational updates. Certain embodiments may include receiving a voice update while the user is using other functionality of the computing device, such as a telecommunication function. Embodiments may also include scheduling an update window within which the update may be delivered. The update window may be a predetermined time window in which a voice update is broadcast, for example. Embodiments may also include alerting the user to a pending update.

40 Claims, 14 Drawing Sheets

SYSTEM AND METHOD OF PROVIDING VOICE UPDATES FROM A NAVIGATION SYSTEM THAT RECOGNIZES AN ACTIVE CONVERSATION

CROSS-REFERENCE TO RELATED APPLICATIONS

This application is a continuation-in-part application filed under paragraph 1.53(b)(2) and claiming priority under 35 U.S.C. §120 to the U.S. application for patent entitled "SYSTEM AND METHOD OF PROVIDING VOICE UPDATES," filed on Apr. 19, 2010 and assigned application Ser. No. 12/763,061, the entire contents of which are hereby incorporated by reference.

DESCRIPTION OF THE RELATED ART

Portable computing devices (PDs) are ubiquitous. These devices may include cellular telephones, portable digital assistants (PDAs), portable game consoles, palmtop computers, portable global positioning system (GPS) devices and other portable electronic devices. Further, many cellular telephones also include GPS capabilities in which, like a stand-alone GPS device, a user may enter a destination. The device may then determine turn-by-turn directions to the destination and provide those directions to the user, e.g., while the user is driving, by broadcasting audible directions at each turn, or step, associated with the turn-by-turn directions. Sometimes the directions may be difficult to hear and a user may miss a turn associated with the directions. Accordingly, what is needed is an improved system and method of providing voice updates.

SUMMARY OF THE DISCLOSURE

Various embodiments of methods and systems for providing informational updates to a user of a portable computing device ("PCD") or navigation system are disclosed. Embodiments include determining that a user of the PCD or navigation system is actively engaged in a conversation, determining that informational update is queued for delivery before expiration of a predetermined time window occurs (such as before the user must turn his automobile onto a different street), monitoring the conversation to recognize a lull in the conversation, and providing a notification that the informational update is queued. Advantageously, by providing the notification, the user may cause a lull to occur in the conversation, thereby providing a suitable opportunity for the queued update to be delivered. The notification may take any of a number of forms including, but not limited to, a quick voice warning, an auditory beep, a series of auditory beeps, a flashing light, a vibration, etc. Additionally, it is envisioned that certain embodiments may increase the intensity of, or otherwise change the delivery of, the notification to indicate to the user that the time window for delivery of the notification is nearing expiration.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
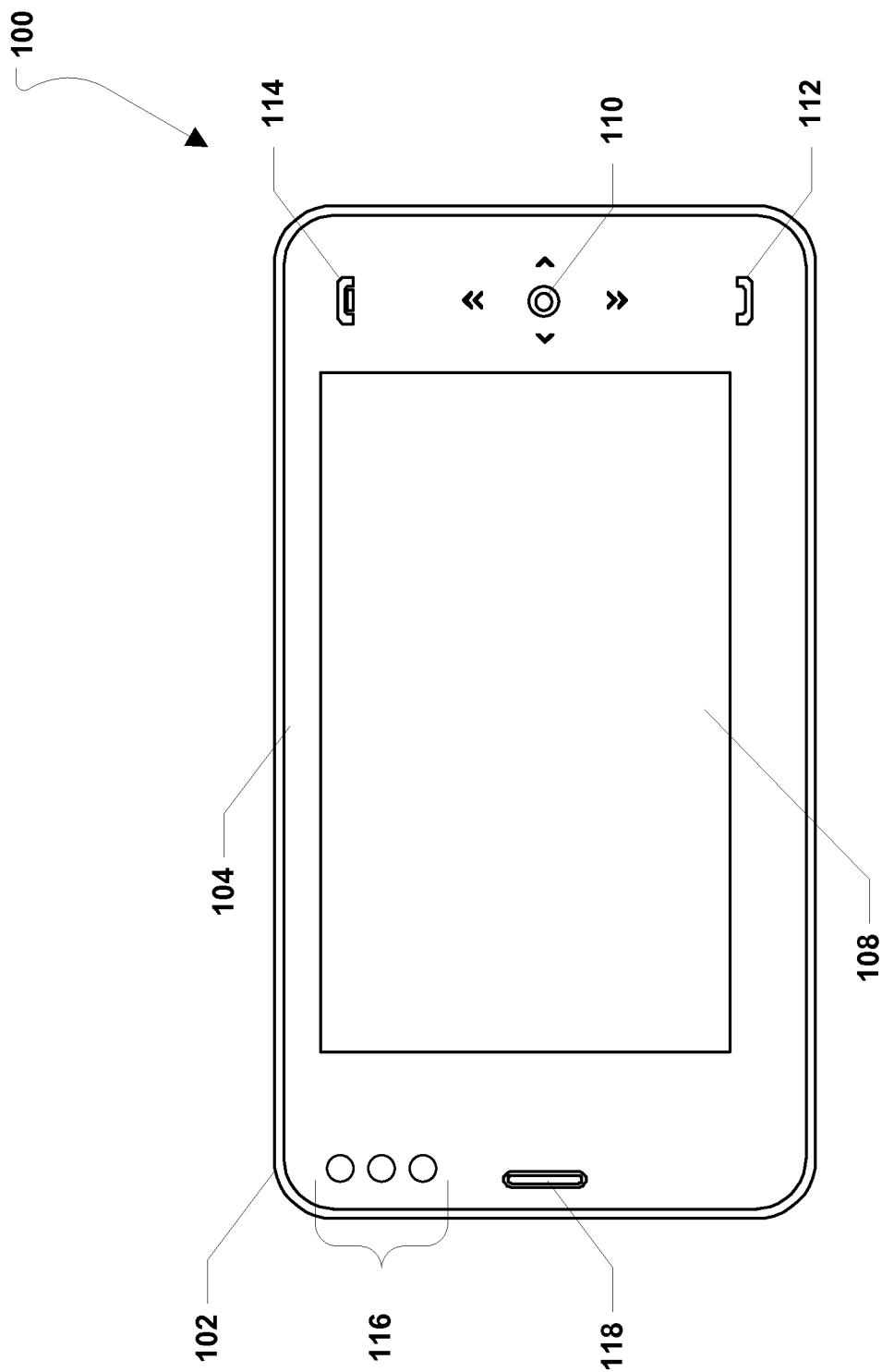
FIG. 1 is a front plan view of a first aspect of a portable computing device (PCD) in a closed position.
Figure 2:
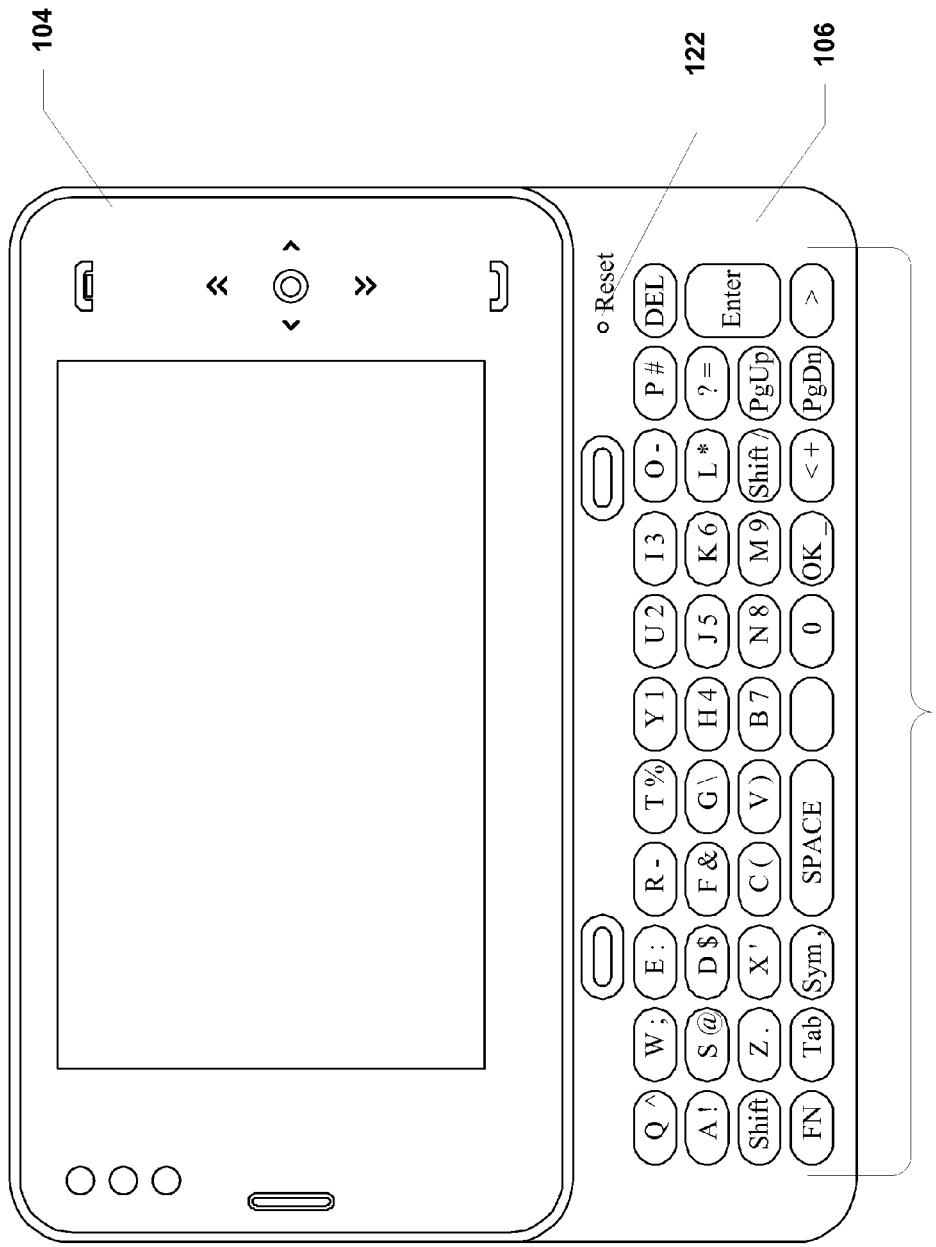
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
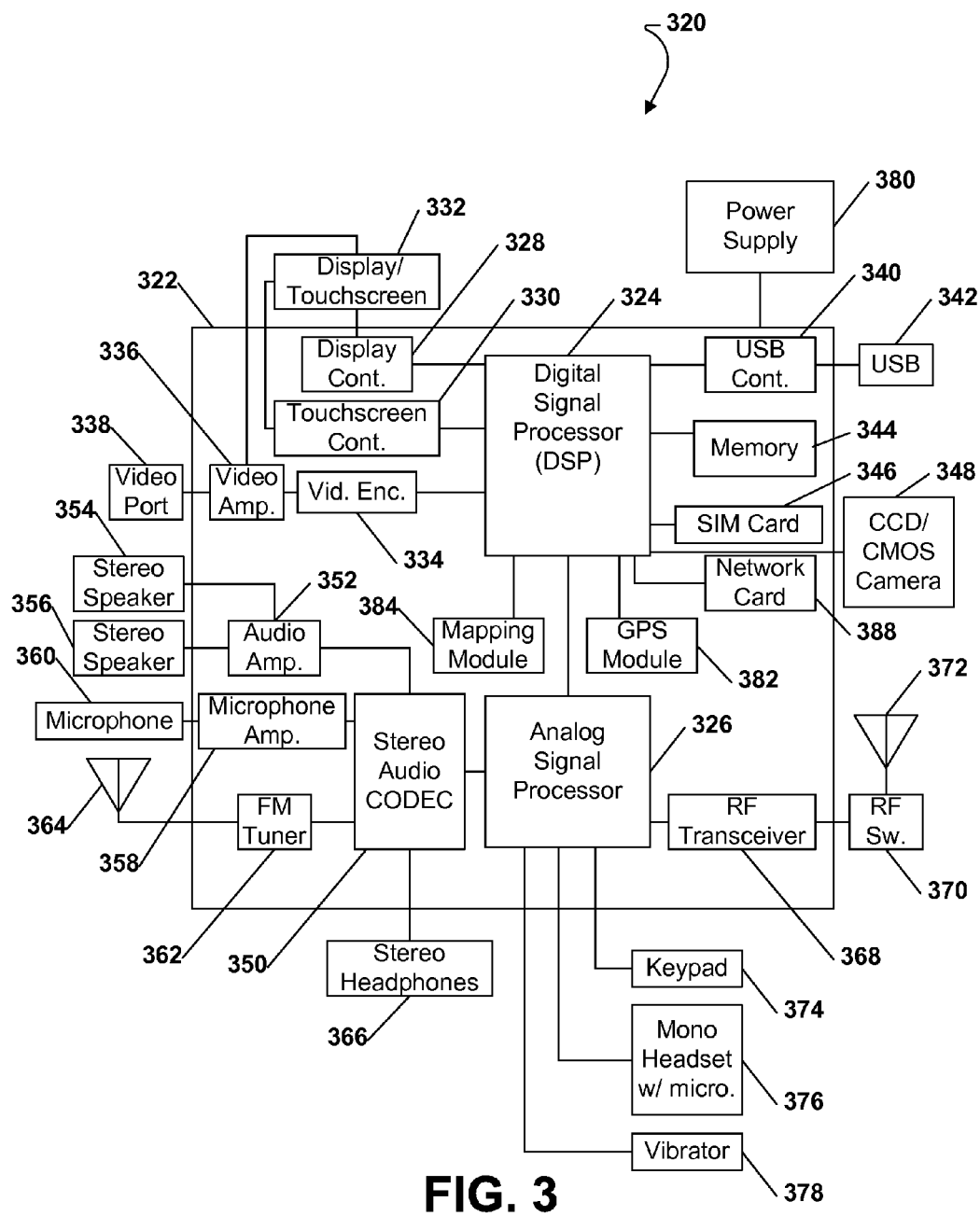
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a digital signal processor 324 and an analog signal processor 326 that are coupled together. The on-chip system 322 may include more than two processors.

As illustrated in FIG. 3, a display controller 328 and a touch screen controller 330 are coupled to the digital signal processor 324. In turn, a touch screen display 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the digital signal processor 324. Further, a video amplifier 336 is coupled to the video encoder 334 and the touch screen display 332. Also, a video port 338 is coupled to the video amplifier 336. As depicted in FIG. 3, a universal serial bus (USB) controller 340 is coupled to the digital signal processor 324. Also, a USB port 342 is coupled to the USB controller 340. A memory 344 and a subscriber identity module (SIM) card 346 may also be coupled to the digital signal processor 324. Further, as shown in FIG. 3, a digital camera 348 may be coupled to the digital signal processor 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the analog signal processor 326. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the analog signal processor 326. An RF switch 370 may be coupled to the RF transceiver 368 and an RF antenna 372. As shown in FIG. 3, a keypad 374 may be coupled to the analog signal processor 326. Also, a mono headset with a microphone 376 may be coupled to the analog signal processor 326. Further, a vibrator device 378 may be coupled to the analog signal processor 326. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

FIG. 3 shows that the PCD 320 may also include a global positioning system (GPS) module 382 which may be used to determine a location of the PCD 320. Further, the PCD 320 may include a mapping module 384 which may be used to determine one or more directions to a destination and provide such directions to a user of the PCD 320, e.g., a user selected destination, a user supplied destination, or a combination thereof. The GPS module 382, the mapping module 384, or a combination thereof may serve as a means for determining a location of the PCD 320, determining one more turn-by-turn directions to a destination from a current location of the PCD 320, and causing such directions to be provided to a user of the PCD 320.

The mapping module 384 may trigger PCD 320 to broadcast each direction update associated with the turn-by-turn directions to a user via the speakers 354, 356. Without one or more of the methods described herein, if a user is having a face-to-face conversation with someone else, the PCD 320 may provide the direction update in a manner that interrupts or interferes with the face-to-face conversation. However, using one or more of the methods described herein, the mapping module 384 of PCD 320 may "listen" to the conversation and detect one or more lulls in the conversation. During the lull, mapping module 384 may cause PCD 320 to broadcast the direction update to the user. As such, the conversation may not be interrupted by the direction update. If a lull does not occur, mapping module 384 may cause the volume of the system to be lowered and the update direction provided to the user in a lower volume. Thus, the interruption of the conversation may be substantially minimized.

Mapping module 384 may further monitor the density of the conversation, e.g., as measured in words per minute. If the density of the conversation satisfies a condition, e.g., the density is greater than a predetermined threshold, the mapping module 384 may increase the brevity of the direction update, i.e., reduce the number of words in the direction update, and the PCD 320 may a broadcast direction update that is briefer than a standard update. Additionally, in some embodiments mapping module 384 may determine that an update should be delivered to the user within a time window and notify or alert the user that an update is queued for delivery, thereby providing the user to create a lull in a conversation.

As depicted in FIG. 3, the touch screen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by a processor 324, 326 in order to perform the methods described herein. Further, the processors 324, 326, the memory 344, the display controller 328, the touch screen controller 330, the GPS module 382, the mapping module 384, or a combination thereof may serve as a means for executing one or more of the method steps described herein in order to display one or more direction updates, broadcast one or more direction updates, or a combination thereof.

Figure 4:
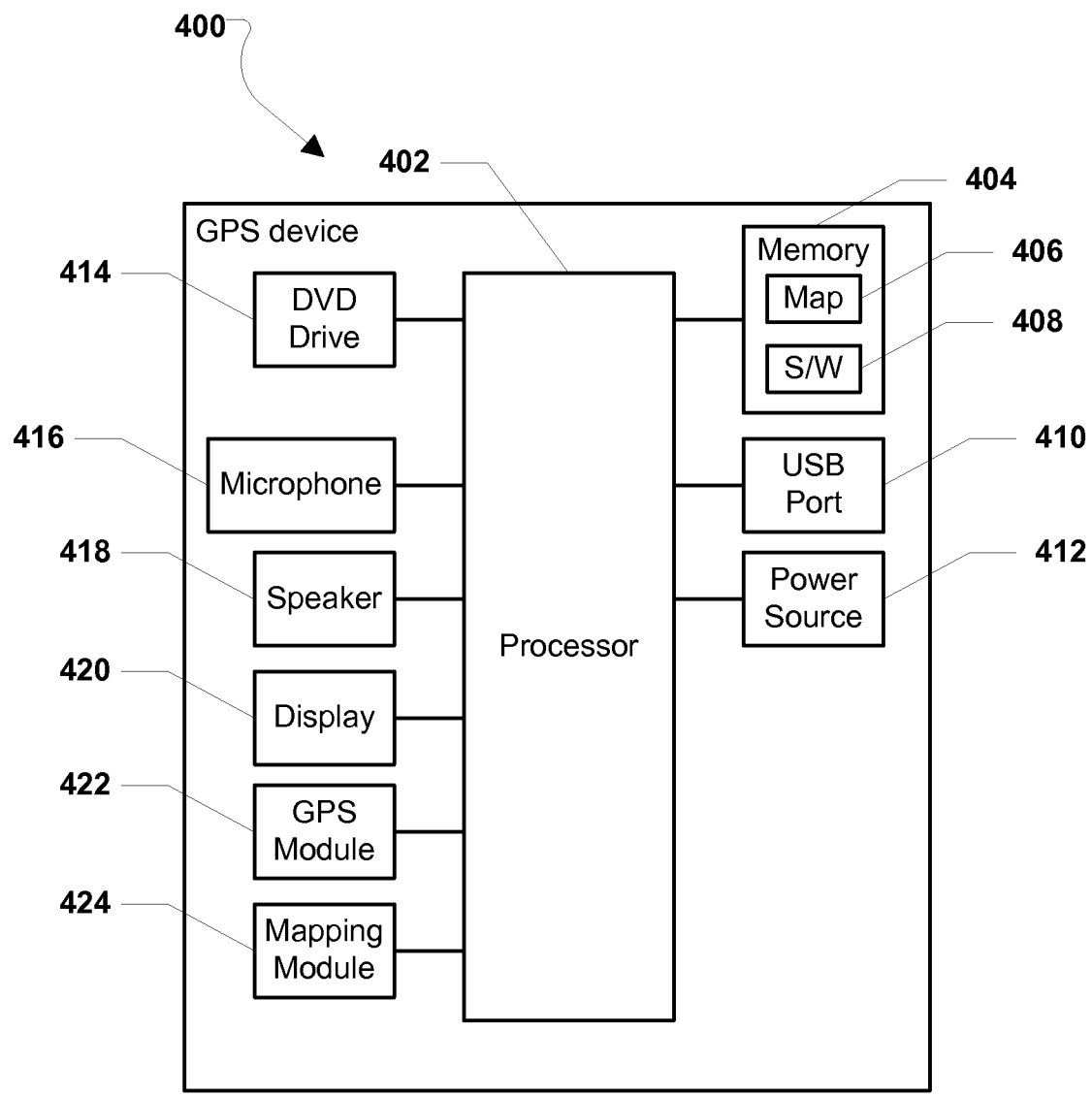
FIG. 4 is a block diagram of an exemplary GPS device.

FIG. 4 illustrates an exemplary GPS device, designated 400. The GPS device 400 may be a portable GPS device. Further, the GPS device 400 may be a built-in GPS device 400. For example, the built-in GPS device 400 may be an in-dash GPS device 400 that is installed in the dashboard of a motorized vehicle, e.g., a car, a truck, a motorcycle, a tractor-trailer, a boat, or a combination thereof.

As shown, the GPS device 400 may include a processor 402. A memory 404 may be connected to the processor 402. The memory 404 may include one or more maps 406 stored thereon. The memory 404 may also include one or more software (S/W) programs 408 thereon. Each map 406 stored on the memory 404 may be associated with a city, state, county, area, or a combination thereof. Further, each map 406 may be searched using one or more destinations in order to locate a destination and to create turn-by-turn direction updates based on the respective map 406. The software 408 may comprise one or more of the method steps described herein and may be executed by the processor 402.

As shown in FIG. 4, the GPS device 400 may include a USB port 410 connected to the processor 402. In the instance that the GPS device 400 is a portable GPS device, the USB port 406 may be used to connect the GPS device 400 to a computer, e.g., a laptop computer or a desktop computer, in order to update the one or more maps 406 stored in the GPS device 400, the one or more software programs 408 stored in the GPS device 400, or a combination thereof.

FIG. 4 further indicates that the GPS device 400 may include a DVD drive 514. In the instance in which the GPS device 400 is a built-in GPS device 400, the DVD drive 514 may be used to update the one or more maps 406 stored in the GPS device 400, the one or more software programs 408 stored in the GPS device 400, or a combination thereof, by installing a DVD containing updates in the DVD drive 514 and executing the DVD. As illustrated, the GPS device 400 may further include a microphone 416 connected to the processor 502. The microphone 416 may be used to "listen" to a conversation, detect a conversation, monitor a conversation or a combination thereof. In other words, the microphone 416 may serve as a means for listening to a conversation, detecting a conversation, monitoring a conversation, or a combination thereof. The GPS device 400 may also include a speaker 418 connected to the processor. The speaker 418 may be used to broadcast one or more direction updates. Further, the speaker 418 may serve as a means for broadcasting one or more direction updates. FIG. 4 further shows that the GPS device 400 may also include a display 420 connected to the processor 402. The display 420 may be a regular display, a touch screen display, or a combination thereof. Moreover, the display 420 may serve as a means for displaying one or more direction updates.

FIG. 4 also shows that the GPS device 400 may include a mapping module 422 connected to the processor 402. Additionally, a GPS module 424 may be connected to the processor 402. The GPS module 424 which may be used to determine a location of the GPS device 400. The mapping module 422 which may be used to determine one or more directions to a destination, e.g., a user selected destination, a user supplied destination, or a combination thereof, from the current location of the GPS device 400. The GPS module 424, the mapping module 422, or a combination thereof may serve as a means for determining a location of the GPS device 500 and for determining one more turn-by-turn directions to a destination from a current location of the GPS device 500.

Figure 5:
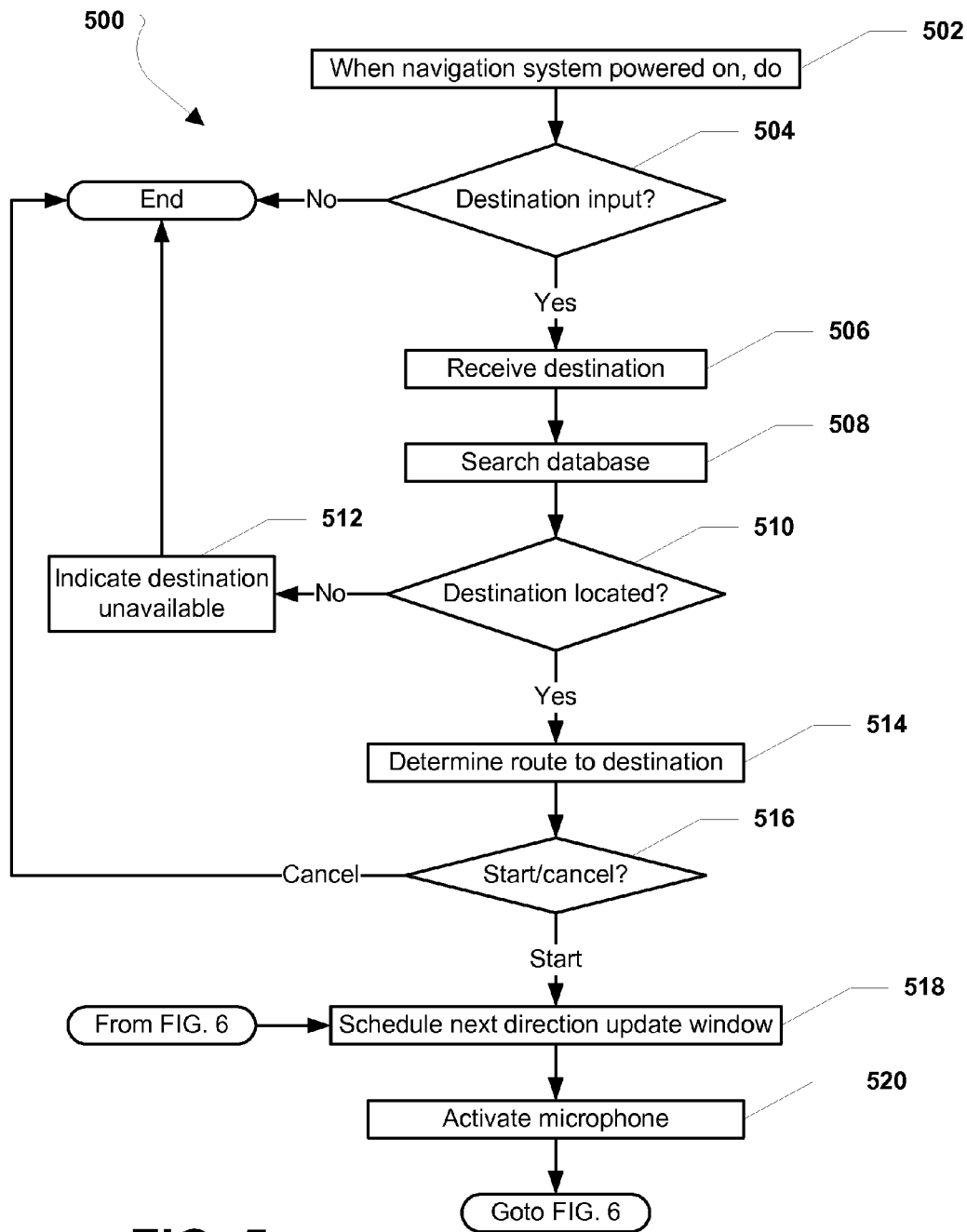
FIG. 5 is a first portion of a flowchart illustrating a first aspect of a method of providing navigation system direction updates.
Figure 6:
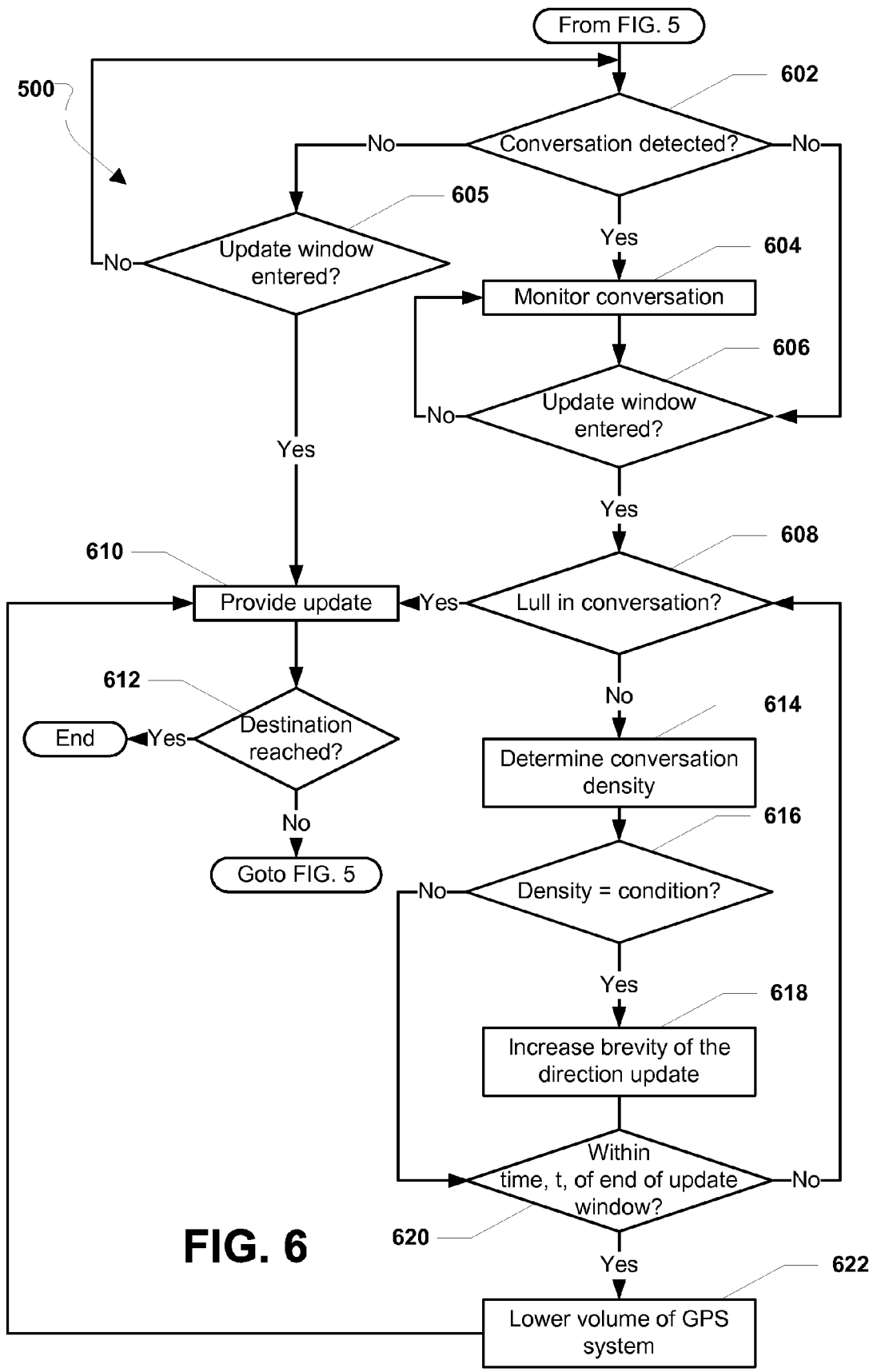
FIG. 6 is a second portion of a flowchart illustrating a first aspect of a method of providing navigation system direction updates.

Referring now to FIG. 5 and FIG. 6, a first method of providing GPS direction updates is shown and is generally designated 500. Beginning at block 502, when a navigation system is powered on the following steps may be performed. In one aspect, the navigation system may be a GPS enabled portable computing device. In another aspect, the navigation system may be a portable GPS device. Still, in another aspect, the navigation system may be a built-in GPS device, i.e., an in-dash GPS device.

Moving to decision 504, the navigation system may determine whether a destination is input. If not, the method 500 may end. Otherwise, at decision 504, if a destination is input, the method 500 may proceed to block 506. At block 506, the navigation system may receive a destination. Further, at block 508, the navigation system may search a database for the destination in order to determine directions for the destination.

At decision 510, the navigation system may determine whether the destination is located in the database and in turn, whether the navigation system is able to determine directions to the destination at least partially based on one or more maps stored in the navigation system or accessible to the navigation system. At decision 510, if the destination is not located within the database, the method 500 may move to block 512 and the navigation system may indicate that the destination is unavailable. Thereafter, the method 500 may end.

Returning to decision 510, if the destination is located in the database by the navigation system, the method 500 may proceed to block 514 and the navigation system may determine a route to the destination with turn-by-turn directions. Each turn may be considered a direction update. At decision 516, the navigation system may determine whether the user selects start or cancel. The user may select start or cancel by touching a soft button, pressing a hard button, or a combination thereof. If the user selects cancel, the method 500 may end.

Otherwise, at decision 516, if the user selects start, the method 500 may proceed to block 518 and the navigation system may schedule a next direction update window. The direction update window may be a predetermined time window in which a particular direction update should be provided, or otherwise broadcast, to the user. The timing for the direction update may be based on a distance to a particular direction change from a current location, the speed at which a user is traveling, a time until the direction change should be made, or a combination thereof. The direction update window may be a predetermined amount of time before and after the scheduled direction update, e.g., twenty seconds (20 sec) before and ten seconds (10 sec) after. Alternatively, the direction update window may be a predetermined amount of time before the scheduled direction update, e.g., thirty seconds (30 sec), and the direction update window may expire at the scheduled direction update. Moving to block 520, the navigation system may activate a microphone. Thereafter, the method 500 may proceed to decision 602 of FIG. 6.

At decision 602 of FIG. 6, the navigation system may determine whether a conversation is detected. In a particular aspect, human speech may be identified based on specific frequency domain characteristics associated with the human speech. The navigation system may "listen" for these specific frequency domain characteristics and if one or more of these specific frequency domain characteristics are identified, the navigation system may determine that a conversation is detected.

At decision 602, if a conversation is not detected, the method 500 may proceed to decision 605 and the navigation system may determine whether the update window is entered. If not, the method 500 may return to decision 602 and the method 500 may continue as described herein. On the other hand, at decision 605, if the update window is entered, the method 500 may proceed to block 610 and the navigation system may provide the current direction update. Thereafter, the method 500 may move to decision 612 and the navigation system may determine whether the destination is reached. If so, the method 500 may end. Otherwise, if the destination is not reached, the method 500 may return to block 518 of FIG. 5 and the method 500 may continue as described herein.

Returning to decision 602, if the navigation system detects a conversation, the method 500 may move to block 604. At block 6040, the navigation system may monitor the conversation. Moreover, at decision 606, the navigation system may determine whether the update window is entered. If the update window is not entered, the method 500 may return to block 604 and the method 500 may proceed as described herein. Conversely, at decision 606, if the update window is entered, the method 500 may proceed to decision 608 and the navigation system may determine if there is a lull in the conversation.

At decision 608, if there is a lull in the conversation, the method 500 may move to block 610. At block 610, the navigation system may provide the current direction update. Thereafter, the method 500 may move to decision 612 and the navigation system may determine whether the destination is reached. If the destination is reached, the method 500 may end. On the hand, if the destination is not reached, the method 500 may return to block 518 of FIG. 5 and the method 500 may continue as described herein.

Returning to decision 608, if the navigation system determines that there is not a lull in the conversation, the method 500 may move to block 614. At block 614, the navigation system may determine a conversation density. The conversation density may be an indication of how many spoken words are occurring per minute. In another aspect, the conversation density may be an indication of how many pauses in the conversation are occurring, wherein each pause is greater than a predetermined amount of time, e.g., two seconds, or a combination thereof.

From block 614, the method 500 may move to decision 616 and the navigation system may determine whether the conversation density is greater than or equal to a condition. For example, if the conversation density is expressed as words per minute, the condition may be twenty words per minute, thirty words per minute, forty words per minute, etc. At decision 616, if the conversation density is greater than or equal to the condition, the method 500 may proceed to block 618 and the navigation system may increase the brevity of the direction update, e.g., by decreasing the words associated with the direction update. In other words, the navigation system may increase the brevity of the direction update by broadcasting more terse directions.

From block 618, the method 500 may move to decision 620 and the navigation system may determine whether a current time is within a predetermined time, t, of the end of the update window, i.e., whether the update window is about to expire. If the current time is not within the predetermined time, t, of the end of the update window, the method 500 may return to decision 608 and the method 500 may continue as described herein.

Returning to decision 620, if the current time is within the predetermined time, t, of the end of the update window, the method 500 may move to block 622. At block 622, the navigation system may lower the volume of the navigation system. Then, the method 500 may move to block 610 and the navigation system may provide, or otherwise broadcast, the direction update. The navigation system may broadcast the direction update via one or more speakers. Alternatively, the navigation system may display the direction update via a display while broadcasting the direction update via one or more speakers. In a particular aspect, the direction update may be the direction update having the increased brevity. Thereafter, the method 500 may continue as described herein. By lowering the volume of the navigation system, the navigation system may provide the direction update while decreasing the possibility of interrupting the conversation.

In another aspect, the navigation system may flash a light as an indication to the user that a direction update is pending. Thereafter, in response to the flashing light, the user may intentionally create a lull in the conversation in order to allow the direction update to be broadcast, or otherwise provided to the user.

Figure 7:
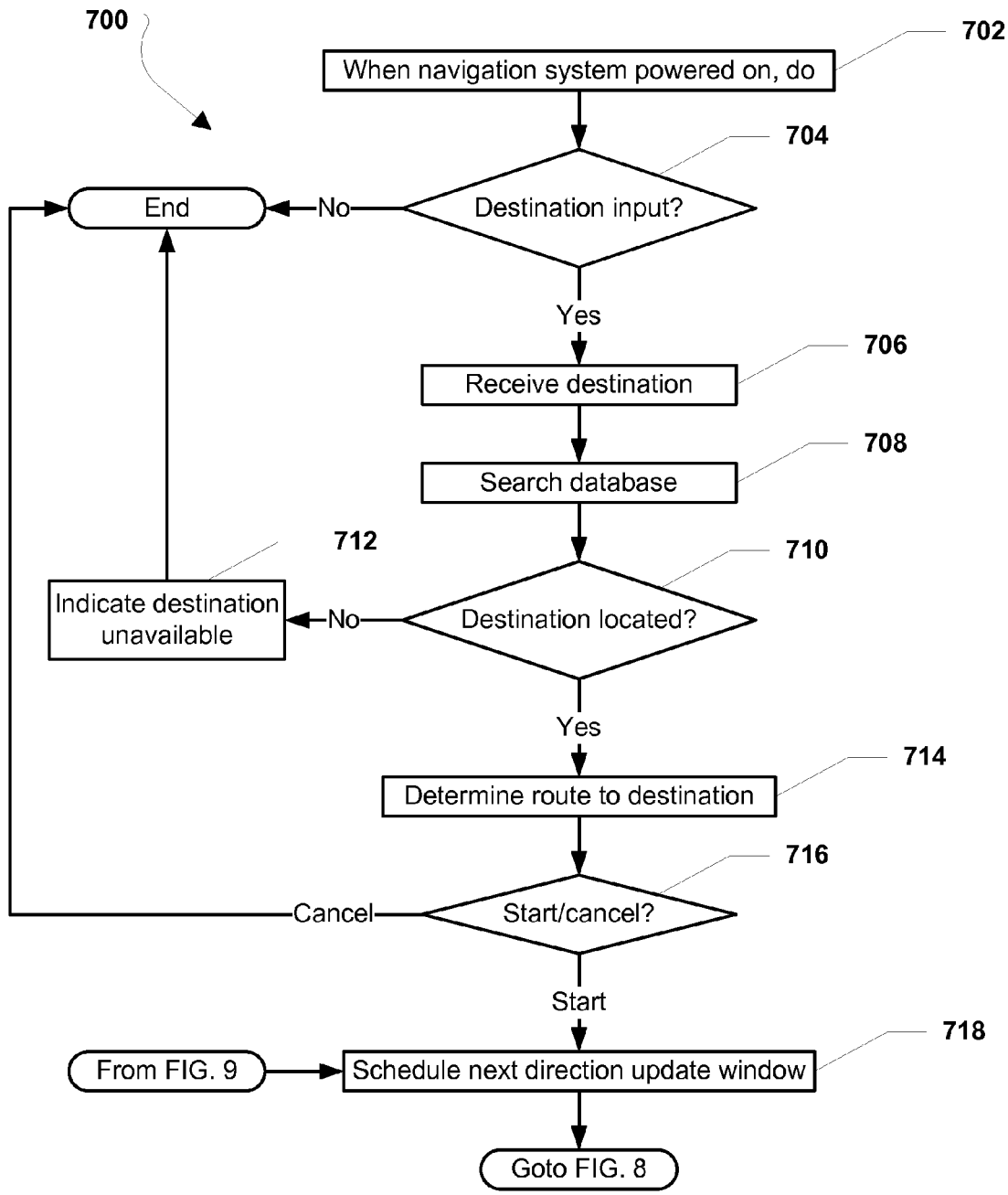
FIG. 7 is a first portion of a flowchart illustrating a second aspect of a method of providing navigation system direction updates.
Figure 8:
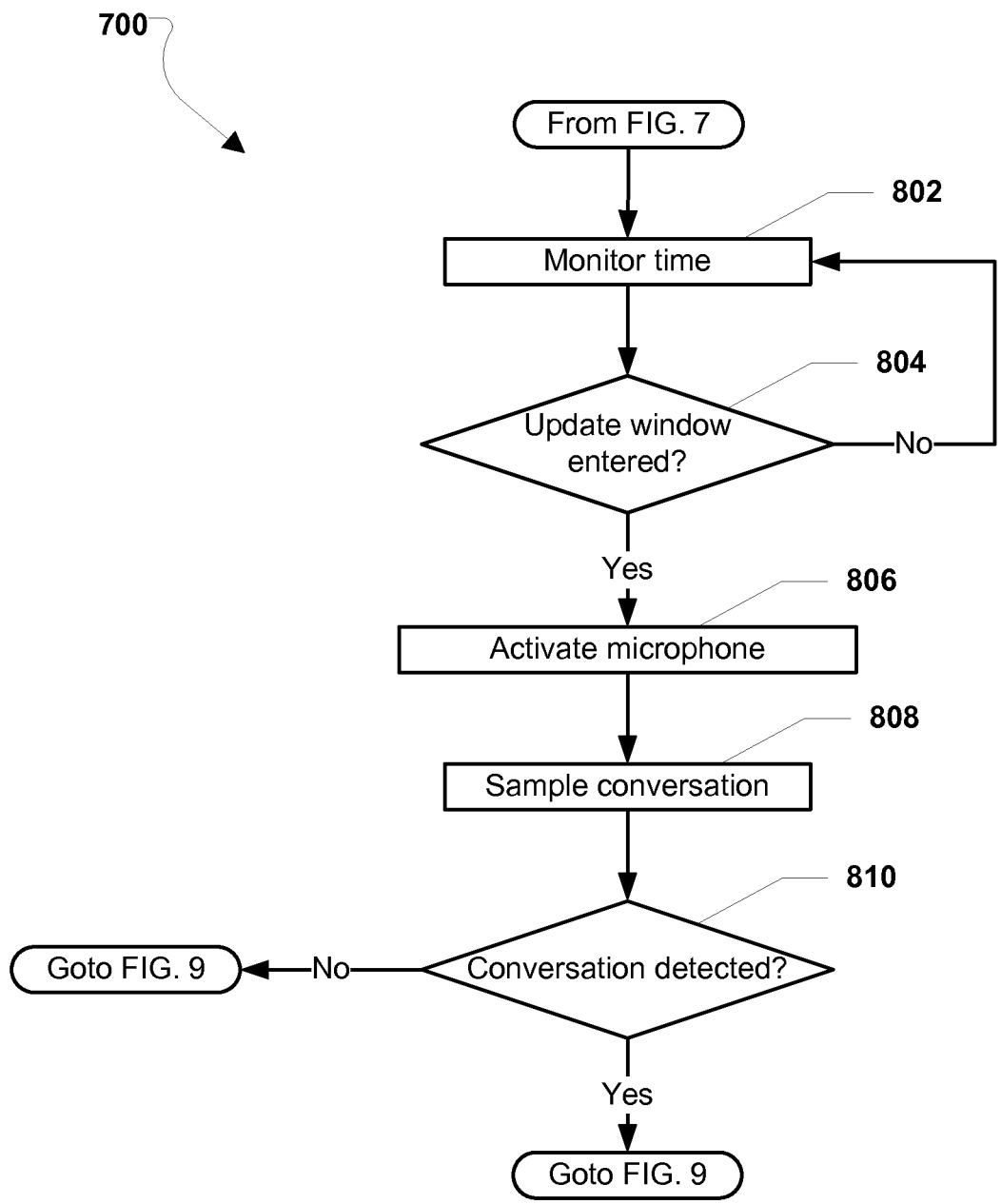
FIG. 8 is a second portion of the flowchart illustrating a second aspect of a method of providing navigation system direction updates.
Figure 9:
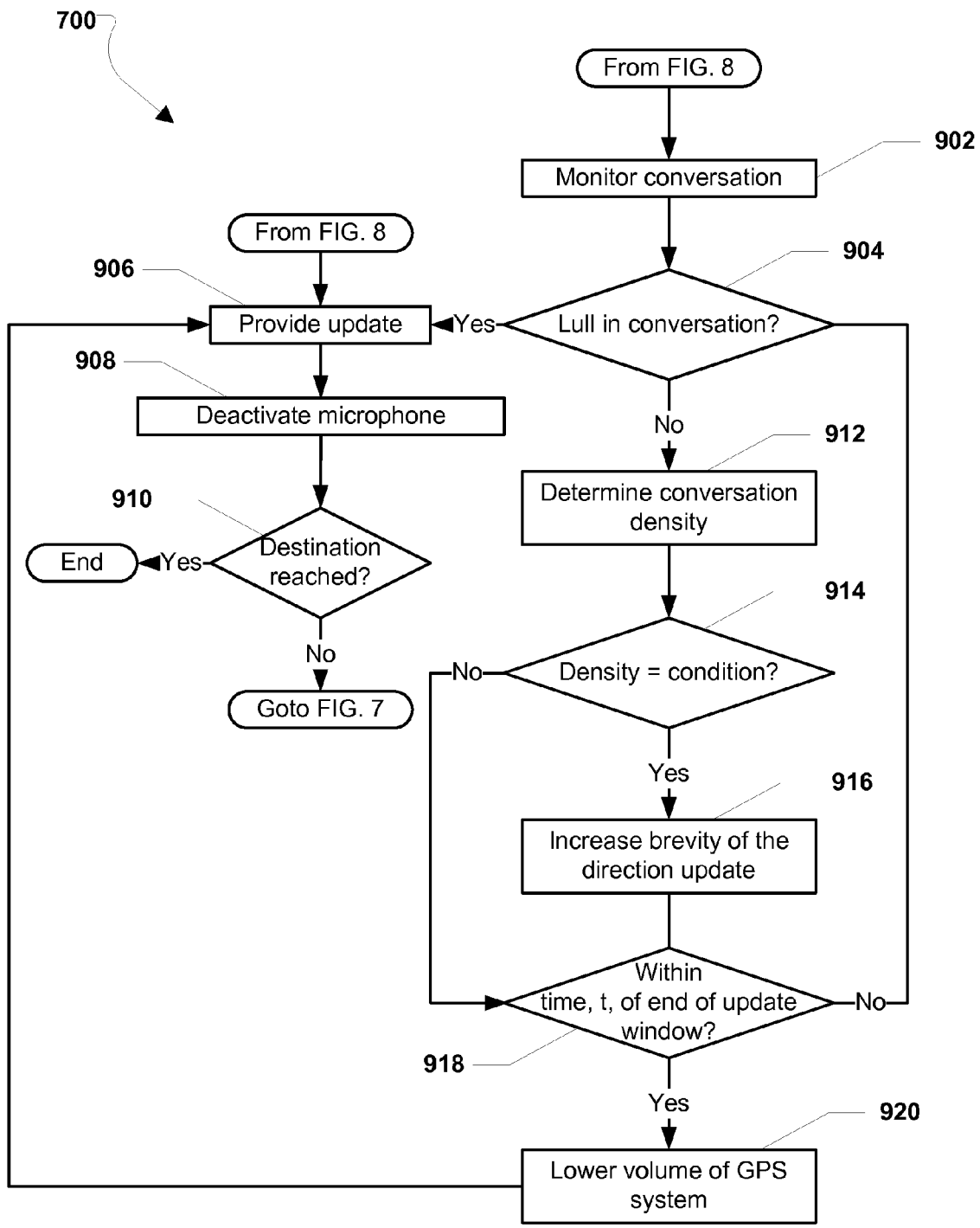
FIG. 9 is a third portion of the flowchart illustrating a second aspect of a method of providing navigation system direction updates.

Referring to FIG. 7 through FIG. 9, a second aspect of a method of providing GPS direction updates is shown and is generally designated 700. Commencing at block 702, when a navigation system is powered on the following steps may be performed. In one aspect, the navigation system may be a GPS enabled portable computing device. In another aspect, the navigation system may be a portable GPS device. Still, in another aspect, the navigation system may be a built-in GPS device, i.e., an in-dash GPS device.

Moving to decision 704, the navigation system may determine whether a destination is input. If not, the method 700 may end. Otherwise, at decision 704, if a destination is input, the method 700 may proceed to block 706. At block 706, the navigation system may receive a destination. Further, at block 708, the navigation system may search a database for the destination in order to determine directions for the destination.

At decision 710, the navigation system may determine whether the destination is located in the database and in turn, whether the navigation system is able to determine directions to the destination at least partially based on one or more maps stored in the navigation system or accessible to the navigation system. At decision 710, if the destination is not located within the database, the method 700 may move to block 712 and the navigation system may indicate that the destination is unavailable. Thereafter, the method 700 may end.

Returning to decision 710, if the destination is located in the database by the navigation system, the method 700 may proceed to block 714 and the navigation system may determine a route to the destination with turn-by-turn directions. Each turn may be considered a direction update. At decision 716, the navigation system may determine whether the user selects start or cancel. The user may select start or cancel by touching a soft button, pressing a hard button, or a combination thereof. If the user selects cancel, the method 700 may end.

Otherwise, at decision 716, if the user selects start, the method 700 may proceed to block 718 and the navigation system may schedule a next direction update window. The direction update window may be a time frame around which a particular direction update should be provided, or otherwise broadcast, to the user. The timing for the direction update may be based on a distance from a particular turn, the speed at which a user is traveling, or a combination thereof. The direction update window may be a predetermined amount of time before and after the scheduled direction update, e.g., twenty seconds (20 sec) before and ten seconds (10 sec) after. Alternatively, the direction update window may be a predetermined amount of time before the scheduled direction update, e.g., thirty seconds (30 sec), and the direction update window may expire at the scheduled direction update. From block 718, the method 700 may continue to 802 of FIG. 8.

At block 802, the navigation system may monitor the time. Then, at decision 804, the navigation system may determine if an update window has been entered. If the update window is not entered, the method 700 may return to block 802 and the method 700 may continue as described herein. If the update window is entered, the method 700 may proceed to block 806 and the navigation system may activate a microphone associated with the navigation system. At block 808, the navigation system may sample the conversation, if any.

Moving to decision 810, the navigation system may determine whether a conversation is detected. In a particular aspect, human speech may be identified based on specific frequency domain characteristics associated with the human speech. The navigation system may "listen" for these specific frequency domain characteristics and if one or more of these specific frequency domain characteristics are identified, the navigation system may determine that a conversation is detected.

At decision 810, if a conversation is detected, the method 700 may proceed to block 902 of FIG. 9. On the other hand, if a conversation is not detected, the method 700 may proceed to block 906 of FIG. 9.

Moving to block 902 of FIG. 9, the navigation system may monitor the conversation. At decision 904, the navigation system may determine whether there is a lull in the conversation. If there is a lull in the conversation, the method 500 may move to block 906. At block 906, the navigation system may provide the current direction update. Then, at block 908, the navigation system may deactivate the microphone.

Moving to decision 910, the navigation system may determine whether the destination is reached. If the destination is reached, the method 700 may end. On the hand, if the destination is not reached, the method 700 may return to block 718 of FIG. 7 and the method 700 may continue as described herein.

Returning to decision 904, if the navigation system determines that there is not a lull in the conversation, the method 700 may move to block 912. At block 912, the navigation system may determine a conversation density. The conversation density may be an indication of how many spoken words are occurring per minute. In another aspect, the conversation density may be an indication of how many pauses in the conversation are occurring, wherein each pause is greater than a predetermined amount of time, e.g., two seconds, or a combination thereof.

From block 912, the method 500 may move to decision 914 and the navigation system may determine whether the conversation density is greater than or equal to a condition. For example, if the conversation density is expressed as words per minute, the condition may be twenty words per minute, thirty words per minute, forty words per minute, etc. At decision 914, if the conversation density is greater than or equal to the condition, the method 700 may proceed to block 916 and the navigation system may increase the brevity of the direction update, e.g., by decreasing the words associated with the direction update. In other words, the navigation system may increase the brevity of the direction update by broadcasting more terse directions.

From block 916, the method 700 may move to decision 918 and the navigation system may determine whether a current time is within a predetermined time, t, of the end of the update window, i.e., whether the update window is about to expire. If the current time is not within the predetermined time, t, of the end of the update window, the method 700 may return to decision 904 and the method 500 may continue as described herein.

Returning to decision 918, if the current time is within the predetermined time, t, of the end of the update window, the method 700 may move to block 920. At block 920, the navigation system may lower the volume of the navigation system. Then, the method 700 may move to block 906 and the navigation system may provide, or otherwise broadcast, the direction update. In a particular aspect, the direction update may be the direction update having the increased brevity. Thereafter, the method 700 may continue as described herein. By lowering the volume of the navigation system, the navigation system may provide the direction update while decreasing the possibility of interrupting the conversation.

Returning to decision 810 of FIG. 8, if a conversation is not detected, the method 700 may proceed directly to block 906 of FIG. 9 and the navigation system may provide the current direction update. Thereafter, at block 908, the navigation system may deactivate the microphone. At decision 910, the navigation system may determine whether the destination is reached. If the destination is reached, the method 700 may end. On the hand, if the destination is not reached, the method 700 may return to block 718 of FIG. 7 and the method 700 may continue as described herein.

Figure 10:
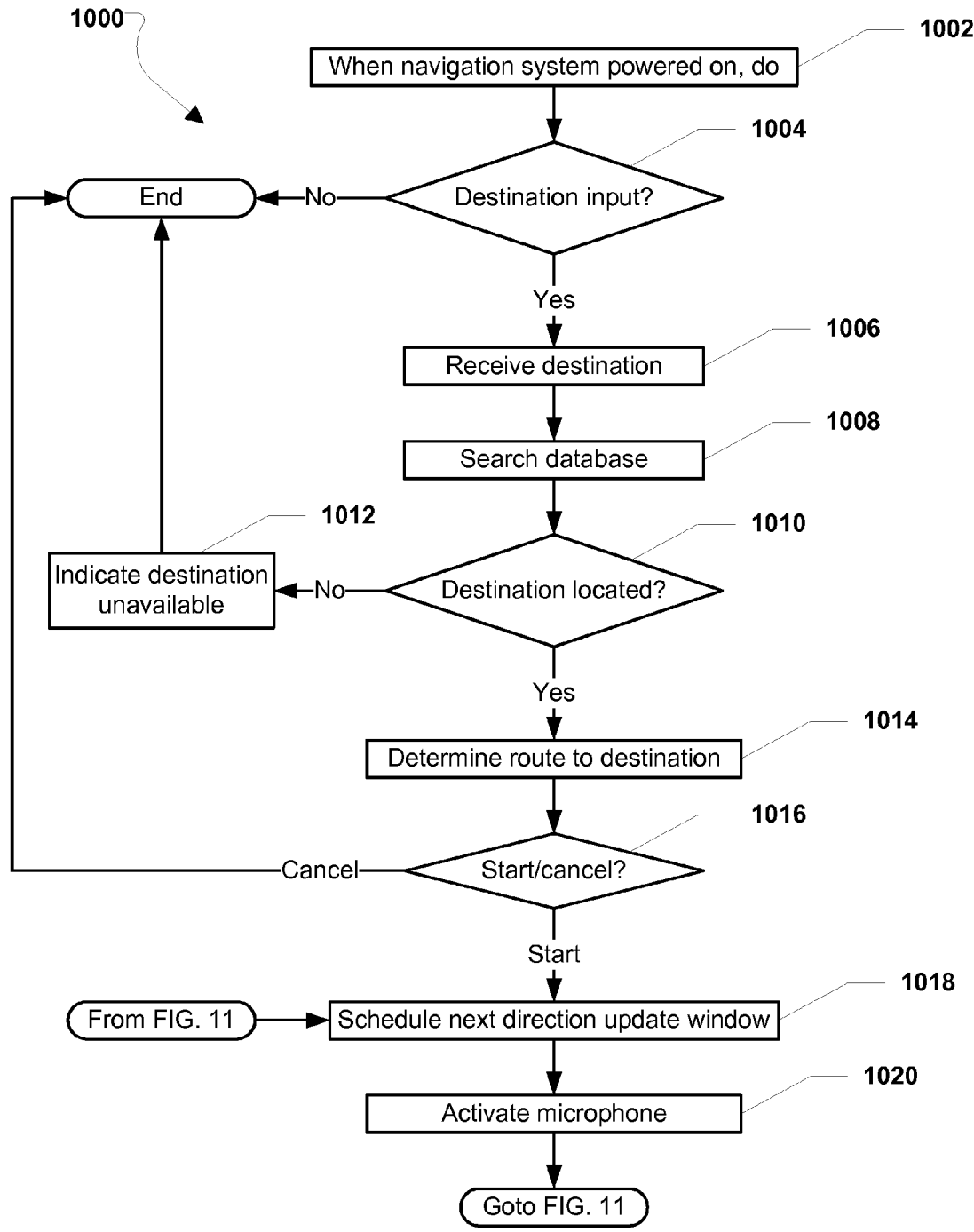
FIG. 10 is a first portion of a flowchart illustrating a third aspect of a method of providing navigation system direction updates.
Figure 11:
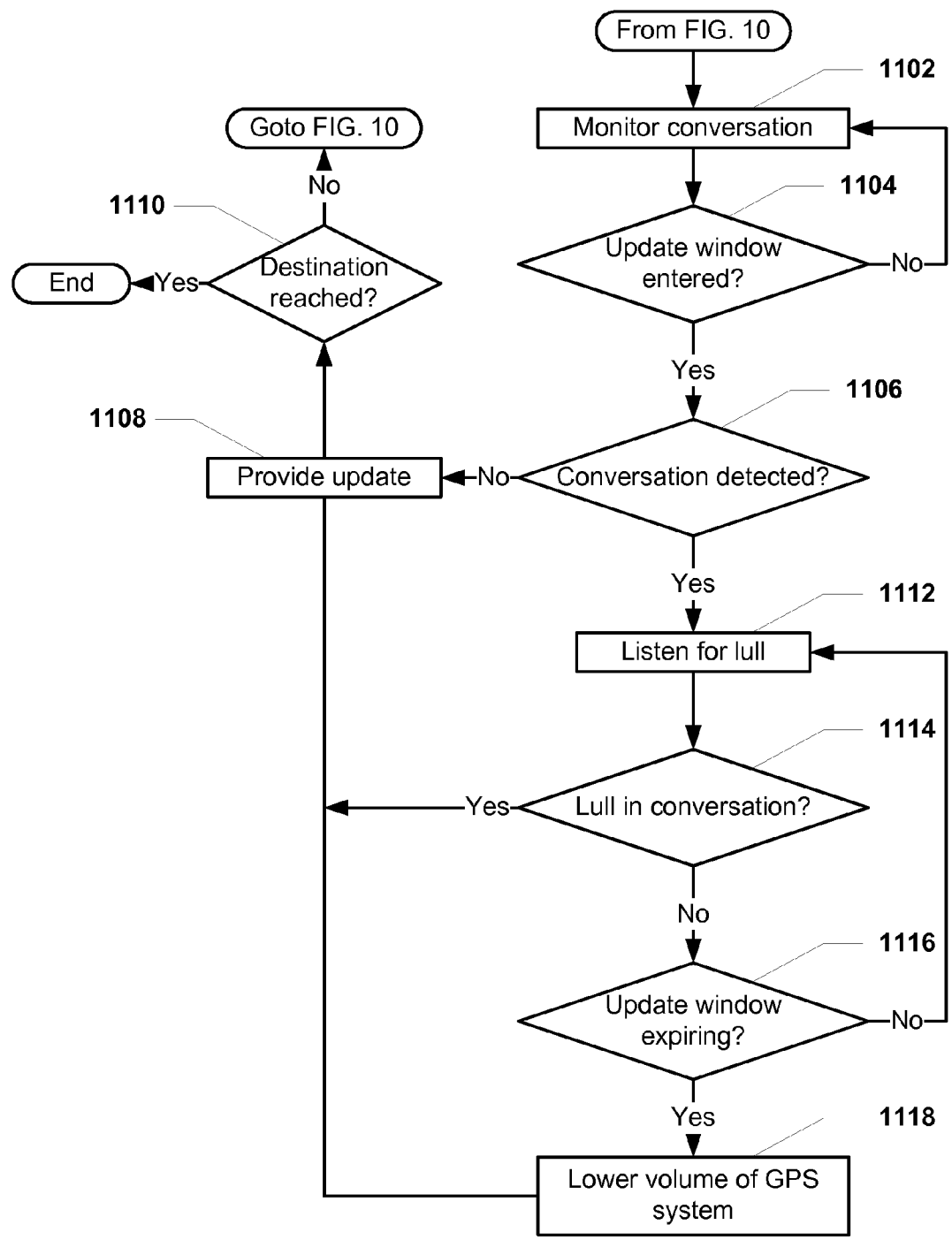
FIG. 11 is a second portion of the flowchart illustrating a third aspect of a method of providing navigation system direction updates.

FIG. 10 and FIG. 11 illustrate a third aspect of a method of providing GPS direction updates that is generally designated 1000. Beginning at block 1002, when a navigation system is powered on the following steps may be performed. In one aspect, the navigation system may be a GPS enabled portable computing device. In another aspect, the navigation system may be a portable GPS device. Still, in another aspect, the navigation system may be a built-in GPS device, i.e., an in-dash GPS device.

Moving to decision 1004, the navigation system may determine whether a destination is input. If not, the method 1000 may end. Otherwise, at decision 1004, if a destination is input, the method 1000 may proceed to block 1006. At block 1006, the navigation system may receive a destination. Further, at block 1008, the navigation system may search a database for the destination in order to determine directions for the destination.

At decision 1010, the navigation system may determine whether the destination is located in the database and in turn, whether the navigation system is able to determine directions to the destination at least partially based on one or more maps stored in the navigation system or accessible to the navigation system. At decision 1010, if the destination is not located within the database, the method 1000 may move to block 1012 and the navigation system may indicate that the destination is unavailable. Thereafter, the method 1000 may end.

Returning to decision 1010, if the destination is located in the database by the navigation system, the method 1000 may proceed to block 1014 and the navigation system may determine a route to the destination with turn-by-turn directions. Each turn may be considered a direction update. At decision 1016, the navigation system may determine whether the user selects start or cancel. The user may select start or cancel by touching a soft button, pressing a hard button, or a combination thereof. If the user selects cancel, the method 1000 may end.

Otherwise, at decision 1016, if the user selects start, the method 1000 may proceed to block 1018 and the navigation system may schedule a next direction update window. The direction update window may be a time frame around which a particular direction update should be provided, or otherwise broadcast, to the user. The timing for the direction update may be based on a distance from a particular turn, the speed at which a user is traveling, or a combination thereof. The direction update window may be a predetermined amount of time before and after the scheduled direction update, e.g., twenty seconds (20 sec) before and ten seconds (10 sec) after. Alternatively, the direction update window may be a predetermined amount of time before the scheduled direction update, e.g., thirty seconds (30 sec), and the direction update window may expire at the scheduled direction update. Moving to block 1020, the navigation system may activate a microphone. Thereafter, the method 1000 may proceed to block 1102 of FIG. 11.

At block 1102 of FIG. 11, the navigation system may monitor a conversation. At decision 1104, the navigation system may determine whether an update window is entered. If not, the method 1000 may return to block 1102 and the method 1000 may continue as described herein. Otherwise, if the update window is entered, the method 1000 may proceed to decision 1106 and the navigation system may determine whether a conversation is detected. If no conversation is detected, the method 1000 may proceed to block 1108 and the navigation system may provide, or otherwise broadcast, a direction update. Then, the method 1000 may move to decision 1110 and the navigation system may determine whether the destination is reached. If so, the method 1000 may end. Otherwise, if the destination is not reached, the method 1000 may return to block 1018 of FIG. 10 and the method 1000 may continue as described herein.

Returning to decision 1106, if a conversation is detected, the method 1000 may continue to block 1112 and the navigation system may listen for a lull in the conversation. Thereafter, at decision 1114, the navigation system may determine if there is a lull in the conversation. At decision 1114, if there is a lull in the conversation, the method 1000 may move to block 1108 and the method 1000 may continue as described herein. Conversely, at decision 1114, if the navigation system determines that there is not a lull in the conversation, the method 1000 may move to decision 1116 and the navigation system may determine whether the update window is expiring.

If the update window is not expiring, the method 1000 may return to block 1112 and the method 1000 may continue as described herein. If the update window is expiring, the method 1000 may proceed to block 1118, and the navigation system may lower the volume of the GPS system. Then, the method 1000 may proceed to block 1108 and proceed as described herein.

Figure 12:
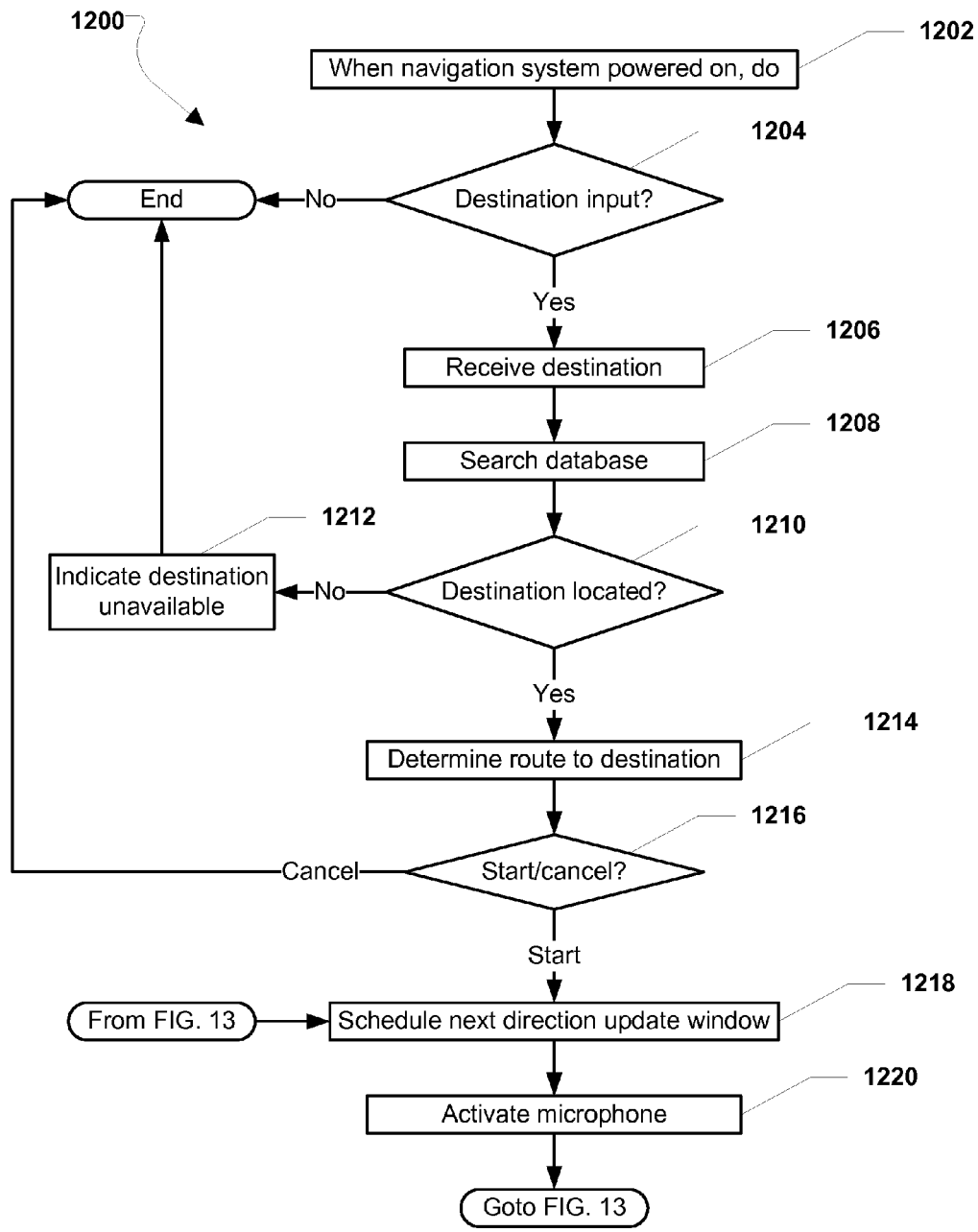
FIG. 12 is a first portion of a flowchart illustrating a fourth aspect of a method of providing navigation system direction updates.
Figure 13:
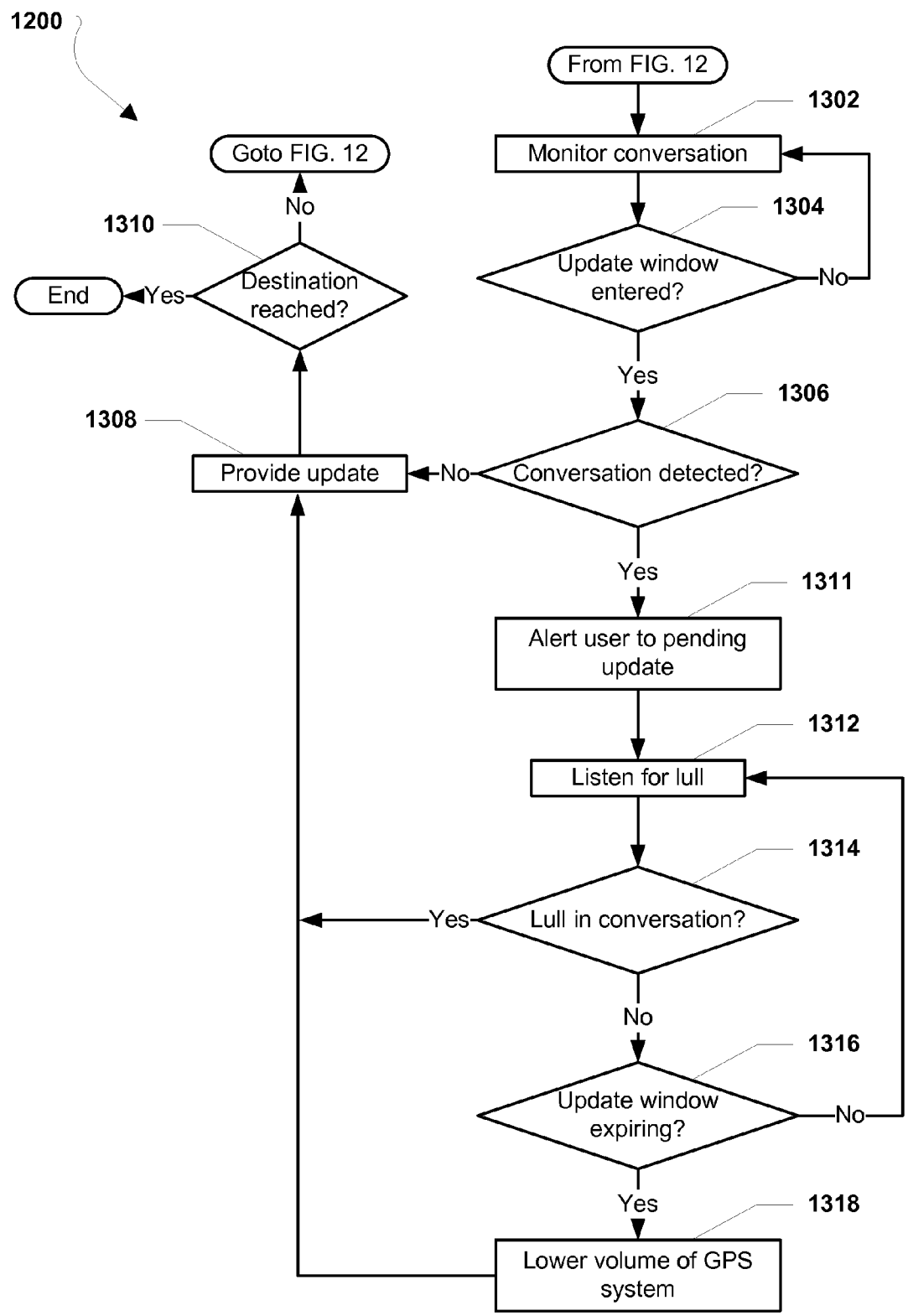
FIG. 13 is a second portion of the flowchart illustrating a fourth aspect of a method of providing navigation system direction updates.

FIG. 12 and FIG. 13 illustrate a fourth aspect of a method 1200 for providing GPS direction updates. Beginning at block 1202, when a navigation system is powered on the following steps may be performed. In one aspect, the navigation system may be a GPS enabled portable computing device. In another aspect, the navigation system may be a portable GPS device. Still, in another aspect, the navigation system may be a built-in GPS device, i.e., an in-dash GPS device.

Moving to decision 1204, the navigation system may determine whether a destination is input. If not, the method 1200 may end. Otherwise, at decision 1204, if a destination is input, the method 1200 may proceed to block 1206. At block 1206, the navigation system may receive a destination. Further, at block 1208, the navigation system may search a database for the destination in order to determine directions for the destination.

At decision 1210, the navigation system may determine whether the destination is located in the database and in turn, whether the navigation system is able to determine directions to the destination at least partially based on one or more maps stored in the navigation system or accessible to the navigation system. At decision 1210, if the destination is not located within the database, the method 1200 may move to block 1212 and the navigation system may indicate that the destination is unavailable. Thereafter, the method 1200 may end.

Returning to decision 1210, if the destination is located in the database by the navigation system, the method 1200 may proceed to block 1214 and the navigation system may determine a route to the destination with turn-by-turn directions. Each turn may be considered a direction update or informational update. At decision 1216, the navigation system may determine whether the user selects start or cancel. The user may select start or cancel by touching a soft button, pressing a hard button, or a combination thereof. If the user selects cancel, the method 1200 may end.

Otherwise, at decision 1216, if the user selects start, the method 1200 may proceed to block 1218 and the navigation system may schedule a next direction update window. The direction update window may be a time frame around which a particular update should be provided, or otherwise broadcast, to the user. The timing for the direction update may be based on a distance from a particular turn, the speed at which a user is traveling, or a combination thereof. The direction update window may be a predetermined amount of time before and after the scheduled direction update, e.g., twenty seconds (20 sec) before and ten seconds (10 sec) after. Alternatively, the direction update window may be a predetermined amount of time before the scheduled direction update, e.g., thirty seconds (30 sec), and the direction update window may expire at the scheduled direction update. Moving to block 1220, the navigation system may activate a microphone. Thereafter, the method 1200 may proceed to block 1302 of FIG. 13.

At block 1302 of FIG. 13, the navigation system may monitor an ongoing or active conversation. Notably, the conversation may be associated with a telecommunication session that is terminated by the navigation system; however, it is envisioned that the conversation may not directly involve use of the navigation system. That is, it is envisioned that the conversation may be the result of communication between occupants of an automobile, or the conversation may be associated with a telecommunication terminated by a device other than the navigation system, or the conversation may be the result of a radio broadcast, etc.

At decision 1304, the navigation system may determine whether an update window is entered. If not, the method 1200 may return to block 1302 and the method 1200 may continue as described herein. Otherwise, if the update window is entered, the method 1200 may proceed to decision 1306 and the navigation system may determine whether a conversation is detected. If no conversation is detected, the method 1200 may proceed to block 1308 and the navigation system may provide, or otherwise broadcast, a direction update. Then, the method 1200 may move to decision 1310 and the navigation system may determine whether the destination is reached. If so, the method 1200 may end. Otherwise, if the destination is not reached, the method 1200 may return to block 1218 of FIG. 12 and the method 1200 may continue as described herein.

Returning to decision 1306, if a conversation is detected, the method 1200 may continue to block 1311 and provide an alert or notification to the user that an update is pending. Advantageously, by alerting the user to a pending update, the system may avoid the need to abruptly interrupt the detected conversation as the user may proactively cause a lull at a convenient point thereby providing the system with an opportunity to deliver the update.

It is envisioned that an alert at block 1311 may be embodied in any number of forms including, but not limited to, a quick voice warning such as "pardon," an auditory beep or series of auditory beeps, a flashing light, a scrolling or flashing message on a screen, a sensory stimulation such as a vibration, a combination of alerts, etc. It is further envisioned that in some embodiments the various alerts may increase in intensity as the need to deliver the update becomes more urgent. By way of example, and not limitation, certain embodiments may alert the user to an increased urgency to provide a pending update by decreasing the time delay between a series of beeps or series of flashing lights, increasing the brightness of a flashing light, changing the color of a light, etc. Moreover, in some embodiments an audible alert such as beeps or voice warnings may increase in volume. Further, in some embodiments visual alerts such as lights or messages may steadily increase in brightness or size as the need to deliver a pending update increases in urgency.

As one of ordinary skill in the art will recognize, the alerts of various embodiments may be provided to the user by the mapping module 384, 424 leveraging any number of components included in a given embodiment such as, but not limited to, lights 116, screen 108, screen 332, speaker 354, 356, vibrator 378, etc. Moreover, as one of ordinary skill in the art would recognize, embodiments that leverage a system integrated into an automobile, such as an in-dash GPS device, or otherwise tethered to a system integrated into an automobile, such as a wirelessly paired portable computing device, may provide an alert of a pending update via vibration of a steering wheel, vibration of a seat, flash of a component such as a navigation screen or light emitting diode, provision of a message on a navigation screen or "heads up" display, etc. In still other embodiments, visual update instructions on a navigation system screen could start flashing or increasing in size (notably, in such embodiments, the need to recognize a lull in a conversation may be avoided).

In still other embodiments, it is envisioned that the alerts may be used in combination and/or prioritized one over the other. For instance, during a conversation, some embodiments may alert the user of a pending update and, if a lull is not provided by a user, provision of the update by voice may be demoted in favor of provision of the update by a message on a screen. Moreover, in such embodiments, it is envisioned that the user may be able to predetermine the priority of update modes, i.e. the user may be able to predetermine that an update will be provided on-screen in the event that a lull is not recognized within a time window.

Further, it is also envisioned that some embodiments may provide for the user to dismiss the pending update. For instance, upon receiving an alert that an update is pending, the user may be able to dismiss the update in lieu of providing a lull for its delivery. To dismiss the update, the user may provide some sort of physical signal, such as a hand wave, that is recognized by a camera component of the system, press a button on a steering wheel, press a soft key on a touch screen, speak a predetermined "code" word or key word such as "quiet" or "thanks," etc.

Returning to FIG. 13 of method 1200, after providing the user with an alert of a pending update at block 1311, the method may continue to block 1312 and the navigation system may listen for a lull in the conversation. Thereafter, at decision 1314, the navigation system may determine if there is a lull in the conversation. At decision 1314, if there is a lull in the conversation, the method 1200 may move to block 1308 and the method 1200 may continue as described herein. Conversely, at decision 1314, if the navigation system determines that there is not a lull in the conversation, the method 1200 may move to decision 1316 and the navigation system may determine whether the update window is expiring.

If the update window is not expiring, the method 1200 may return to block 1312 and the method 1200 may continue as described herein. If the update window is expiring, the method 1200 may proceed to block 1318, and the navigation system may lower the volume of the GPS system. Then, the method 1200 may proceed to block 1308 and proceed as described herein.

Figure 14:
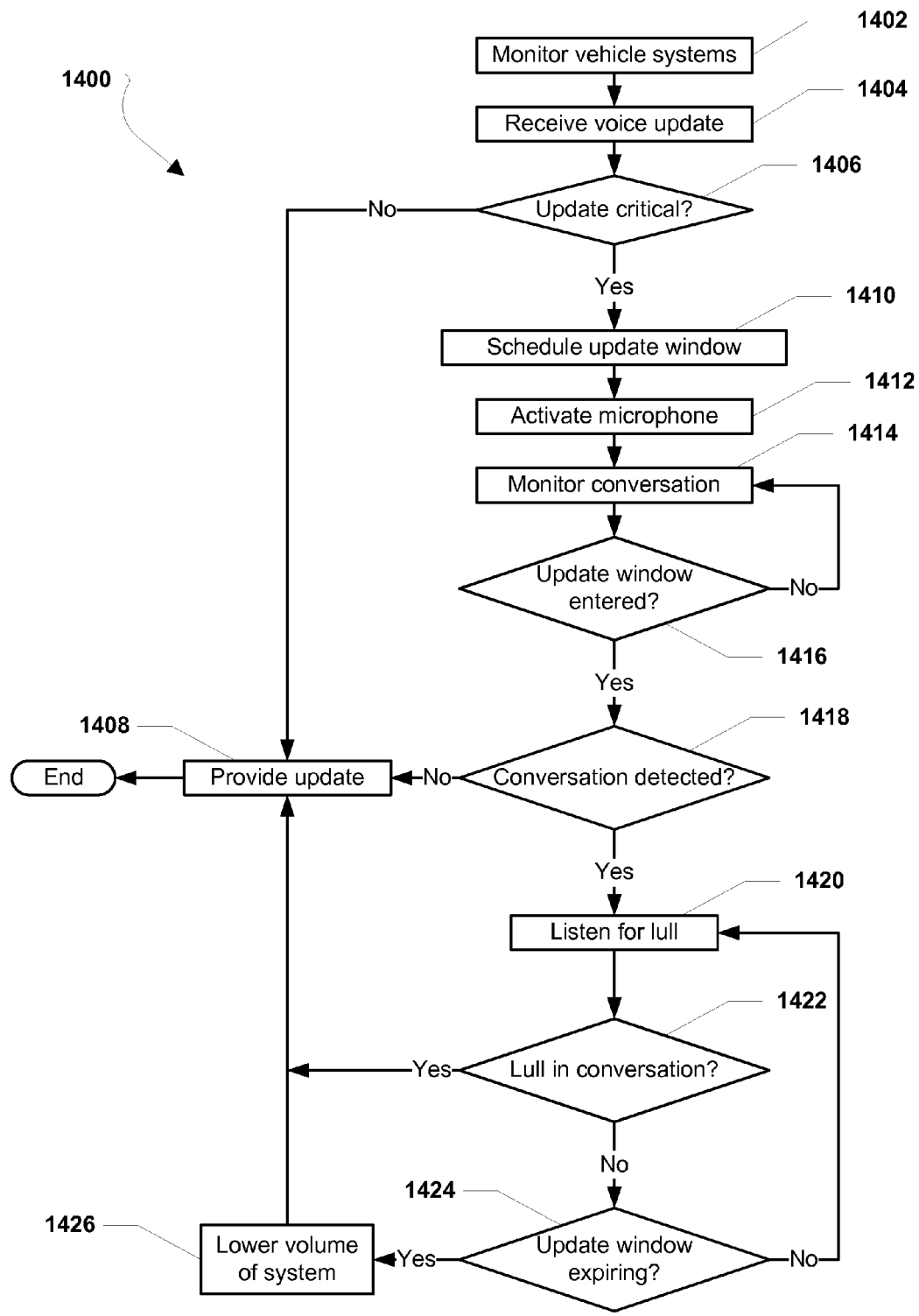
FIG. 14 is a flowchart illustrating a method of providing voice updates.

Referring now to FIG. 14, a method of providing voice updates is shown and is generally designated 1400. Beginning at block 1402, one or more vehicle systems may be monitored by an update system. At block 1404, the update system may receive a voice update from one or more vehicle systems, or sub systems.

Moving to decision 1406, the update system may determine whether the update is critical, e.g., has an engine oil temperature exceed a critical threshold. If so, the method 1400 may proceed directly to block 1408 and the update system may provide the update to the user. Thereafter, the method 1400 may end.

Returning to decision 1406, if the update is not critical, e.g., the fuel level is low, the vehicle requires servicing, etc., the method 1400 may proceed to block 1410. At block 1410, the update system may a voice update window. The voice update window may be a time frame in the future in which a particular voice update should be provided, or otherwise broadcast, to the user. Next, at block 1412, the update system may activate a microphone. At block 1412, the update system may monitor a conversation.

Proceeding to decision 1416, the update system may determine whether an update window is entered. If not, the method 1400 may return to block 1414 and the method 1400 may continue as described herein. Otherwise, if the update window is entered, the method 1400 may proceed to decision 1418 and the update system may determine whether a conversation is detected. If no conversation is detected, the method 1400 may proceed to block 1408 and the update system may provide, or otherwise broadcast, the voice update. Then, the method 1400 may end.

Returning to decision 1418, if a conversation is detected, the method 1400 may continue to block 1420 and the update system may listen for a lull in the conversation. Thereafter, at decision 1422, the update system may determine if there is a lull in the conversation. At decision 1422, if there is a lull in the conversation, the method 1400 may move to block 1408 and the method 1400 may continue as described herein. Conversely, at decision 1422, if the update system determines that there is not a lull in the conversation, the method 1400 may move to decision 1424 and the update system may determine whether the update window is expiring.

If the update window is not expiring, the method 1400 may return to block 1420 and the method 1400 may continue as described herein. If the update window is expiring, the method 1400 may proceed to block 1426, and the navigation system may lower the volume of the system. Then, the method 1400 may proceed to block 1408 and proceed as described herein.

Accordingly, a vehicle may include a vehicle update system that may provide other types of voice updates may operate in a manner similar to the methods described above. For example, a vehicle update system may be configured to provide voice updates to a user based on one or more vehicle parameters. The vehicle system may provide a voice update when the vehicle is low on fuel, when a change in engine oil pressure occurs, when a battery level is low, when a change in tire pressure occurs, when a change in engine temperature occurs, when a cooling fluid is low, when a brake fluid is low, when a transmission fluid is low, when an oil life is nearing completion and needs changing, when a brake pad needs changing, when any other maintenance needs to be performed, or any combination thereof.

The vehicle update system may monitor any conversation that occurs in the vehicle cabin and provide one or more voice updates during any appropriate lulls before damage to a vehicle occurs. The vehicle update system may interact with a vehicle control module (VCM), a body control module (BCM), an engine control module (ECM), a transmission control module (TCM), anti-lock braking system module (ABSM), an instrument panel cluster (IPC), an active handling module (AHM), a radio module (RM), a heater/ventilation/air conditioning module (HVAC), a navigation system module (NSM), or a combination thereof in order to monitor one or more of the appropriate vehicle parameters, e.g., an engine temperature, an engine oil pressure, a brake fluid level, a remaining oil life, a transmission fluid level, a coolant level, a fuel level, a battery level, a refrigerant level, an instrument light operation, a headlight operation, a taillight operation, a turn signal operation, an instrument operation, any other consumable, any other fluid level, or a combination thereof.

In a particular aspect, a portable computing device (PCD), such as a mobile telephone, may include a software application that interacts with the VCM, BCM, ECM, TCM, ABSM, IPC, AHM, RM, HVACM, NSM, or a combination thereof. The PCD may communicate with the VCM, BCM, ECM, TCM, ABSM, IPC, AHM, RM, HVACM, NSM, or a combination thereof, directly. Alternatively, the PCD may communicate with the VCM, BCM, ECM, TCM, ABSM, IPC, AHM, RM, HVACM, NSM, or a combination thereof indirectly, e.g., through the vehicle update system.

Further, the PCD may VCM, BCM, ECM, TCM, ABSM, IPC, AHM, RM, HVACM, NSM, wirelessly or through a wired connection. The wireless connection may include a Wi-Fi connection, e.g., 802.11a, 802.11b, 802.11n, or a combination thereof. The wireless connection may also include a Bluetooth connection or some other wireless connection. In another aspect, the PCD may be connected to the vehicle update system via a wire, a docking station, or a combination thereof.

In either case, the PCD may receive one or more instructions from the VCM, BCM, ECM, TCM, ABSM, IPC, AHM, RM, HVACM, NSM, or a combination thereof in order to provide a voice update to the user. Thereafter, the PCD may monitor the conversation within the vehicle cabin in order to provide the voice update to the user at the appropriate time, e.g., during a conversation lull.

In the instance that a vehicle parameter is approaching a critical level, e.g., the vehicle is about to run out of fuel, the oil pressure has dropped below a critical level, the engine temperature has gone above a critical level, a tire air pressure has dropped below a critical level, the system may aggressively seek to detect a lull in the conversation in order to provide the voice update to the user without interrupting the user conversation. If the system does not detect a lull and the critical level is reached, the system may provide the voice update to the user regardless of the conversation status.

Accordingly, a voice update may include a navigation system direction update, an update from the VCM (i.e., a VCM update), an update from the BCM (i.e., a BCM update), an update from the ECM (i.e., an ECM update), an update from the TCM (i.e., a TCM update), an update from the ABSM (i.e., an ABSM update), an update from the IPC (i.e., an IPC update), an update from the AHM (i.e., an AHM update), an update from the RM (i.e., an RM update), an update from the HVACM (i.e., an HVACM update), an update from the NSM (i.e., an NSM update), or a combination thereof.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD), a portable GPS device, a built-in GPS device, or a combination thereof. The PCD may be a mobile telephone device, a portable digital assistant device, a smartbook computing device, a netbook computing device, a laptop computing device, a desktop computing device, or a combination thereof. Also, the various method steps may be combined in any order in order to create new methods.

With the configuration of structure described herein, the systems and methods may monitor the audio environment, e.g., within a vehicle, in order to detect a conversation within the vehicle and schedule turn-by-turn direction updates to natural lulls in the conversation—similar to what a human navigator might do. The navigation systems described herein may also adapt the brevity of direction updates according to the density of conversation. Further, the navigation systems described herein may also schedule some updates earlier than usual to take advantage of conversation lulls.

In a particular aspect, the navigation systems may monitor the audio environment to detect speech. In a particular aspect, specifically human speech is identified using specific identifiable frequency domain characteristics. In another aspect, the navigation systems may simply monitor the average audio level and higher audio levels may suggest, or otherwise indicate, conversation.

In one aspect, the monitoring for conversation may be continuous. In another aspect, the monitoring for conversation may be sporadic. With continuous monitoring, a navigation system may continuously listen for conversation and the presence/absence of conversation is available at any time. With sporadic monitoring, the navigation system may sample for conversation just prior to the point when it would need to make a direction update.

In either implementation, e.g., continuous or sporadic monitoring, rather than using a single time/distance point to trigger the next direction update, a navigation system may use an update window for each update. The start of the update window is the earliest time at which it would be reasonable to provide the next spoken direction update. The end of the update window is the latest time at which it would be reasonable to provide the next spoken direction update. For example, a thirty second (30 sec) window may span twenty seconds (20 sec) prior to an original trigger point and ten seconds (10 sec) following the original trigger point.

When the update window is entered, a navigation system may either sporadically sample the conversation state, or it can read the conversation state from the continuous monitor. In either case, if there is an on-going conversation, the navigation system may wait for a minimum configurable lull in the conversation, e.g., for example, two seconds (2 sec), or otherwise, for the window to expire before it announces the next direction.

Using continuous monitoring, the navigation system may maintain a history of conversation state. If it enters the update window with a recent history, e.g., with the previous twenty seconds (20 sec) of absent conversation, the system may wait until much closer to the original trigger point before broadcasting the direction update. Conversely, if conversation has been active recently, the system may aggressively look for the earliest conversation lull, with the expectation that the conversation will continue.

The navigation system may maintain a history of the conversation state based either on continuous or sporadic samples. Further, the navigation system may adapt the direction updates for brevity according to the conversation level. For example, in the absence of conversation, the navigation system may give verbose directions, e.g., "At the next intersection, please make a right onto Vista Sorrento Parkway and continue for two miles." In the presence of conversation, the navigation system may give terse directions, e.g., "Turn right ahead."

The navigation systems described herein may monitor a face-to-face conversation between two or more persons in a vehicle. Further, in the instance that a navigation system, e.g., a GPS system, on a wireless telephone is used to monitor and provide instructions, the navigation system may listen to both sides of the telephone conversation occurring via the wireless telephone.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/ or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted over as one or more instructions or code on a computer program product such as a machine readable medium, i.e., a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for providing informational updates from a navigation system, the method comprising:
    recognizing an active conversation;
    determining that an informational update is queued for delivery before expiration of a predetermined time window;
    monitoring the conversation to recognize a lull, wherein the lull presents an opportunity to deliver the informational update; and
    providing a notification that the informational update is queued, thereby prompting creation of the lull.

2. The method of claim 1, wherein the notification comprises a voice warning.

3. The method of claim 1, wherein the notification comprises an auditory beep.

4. The method of claim 1, wherein the notification comprises a series of auditory beeps.

5. The method of claim 4, wherein a time delay between sequential beeps is shortened as expiration of the predetermined time window is approached.

6. The method of claim 4, wherein volume of the auditory beeps is increased as expiration of the predetermined time window is approached.

7. The method of claim 1, wherein the notification comprises a flashing light.

8. The method of claim 7, wherein a time delay between sequential flashes is shortened as expiration of the predetermined time window is approached.

9. The method of claim 7, wherein brightness of the flashing light is increased as expiration of the predetermined time window is approached.

10. The method of claim 1, wherein the notification comprises a vibration.

11. A computer system for providing informational updates, the system comprising:
   a mapping module, configured to:
   recognize an active conversation;
   determine that an informational update is queued for delivery before expiration of a predetermined time window;
   monitor the conversation to recognize a lull, wherein the lull presents an opportunity to deliver the informational update; and
   provide a notification that the informational update is queued, thereby prompting creation of the lull.

12. The computer system of claim 11, wherein the notification comprises a voice warning.

13. The method of claim 11, wherein the notification comprises an auditory beep.

14. The method of claim 11, wherein the notification comprises a series of auditory beeps.

15. The method of claim 14, wherein a time delay between sequential beeps is shortened as expiration of the predetermined time window is approached.

16. The method of claim 14, wherein volume of the auditory beeps is increased as expiration of the predetermined time window is approached.

17. The method of claim 11, wherein the notification comprises a flashing light.

18. The method of claim 17, wherein a time delay between sequential flashes is shortened as expiration of the predetermined time window is approached.

19. The method of claim 17, wherein brightness of the flashing light is increased as expiration of the predetermined time window is approached.

20. The method of claim 11, wherein the notification comprises a vibration.

21. A computer system for providing informational updates, the system comprising:
   means for recognizing an active conversation;
   means for determining that an informational update is queued for delivery before expiration of a predetermined time window;
   means for monitoring the conversation to recognize a lull, wherein the lull presents an opportunity to deliver the informational update; and
   means for providing a notification that the informational update is queued, thereby prompting creation of the lull.

22. The computer system of claim 21, wherein the notification comprises a voice warning.

23. The computer system of claim 21, wherein the notification comprises an auditory beep.

24. The computer system of claim 21, wherein the notification comprises a series of auditory beeps.

25. The computer system of claim 24, wherein a time delay between sequential beeps is shortened as expiration of the predetermined time window is approached.

26. The computer system of claim 24, wherein volume of the auditory beeps is increased as expiration of the predetermined time window is approached.

27. The computer system of claim 21, wherein the notification comprises a flashing light.

28. The computer system of claim 27, wherein a time delay between sequential flashes is shortened as expiration of the predetermined time window is approached.

29. The computer system of claim 27, wherein brightness of the flashing light is increased as expiration of the predetermined time window is approached.

30. The computer system of claim 21, wherein the notification comprises a vibration.

31. A computer program product comprising a computer usable medium having a computer readable program code embodied therein, said computer readable program code adapted to be executed to implement a method for providing informational updates from a navigation system, said method comprising:
   recognizing an active conversation;
   determining that an informational update is queued for delivery before expiration of a predetermined time window;
   monitoring the conversation to recognize a lull, wherein the lull presents an opportunity to deliver the informational update; and
   providing a notification that the informational update is queued, thereby prompting creation of the lull.

32. The computer program product of claim 31, wherein the notification comprises a voice warning.

33. The computer program product of claim 31, wherein the notification comprises an auditory beep.

34. The computer program product of claim 31, wherein the notification comprises a series of auditory beeps.

35. The computer program product of claim 34, wherein a time delay between sequential beeps is shortened as expiration of the predetermined time window is approached.

36. The computer program product of claim 34, wherein volume of the auditory beeps is increased as expiration of the predetermined time window is approached.

37. The computer program product of claim 31, wherein the notification comprises a flashing light.

38. The computer program product of claim 37, wherein a time delay between sequential flashes is shortened as expiration of the predetermined time window is approached.

39. The computer program product of claim 37, wherein brightness of the flashing light is increased as expiration of the predetermined time window is approached.

40. The computer program product of claim 31, wherein the notification comprises a vibration.

* * * * *